United States Patent [19]

Fetscher et al.

[11] 3,849,187

[45] Nov. 19, 1974

[54] ENCAPSULANT COMPOSITIONS FOR SEMICONDUCTORS

[75] Inventors: Charles A. Fetscher; Michael J. Rosso, both of Olean, N.Y.

[73] Assignee: The Dexter Corporation, Windsor Locks, Conn.

[22] Filed: Mar. 27, 1972

[21] Appl. No.: 238,697

Related U.S. Application Data

[63] Continuation of Ser. No. 65,272, March 8, 1970, abandoned, which is a continuation of Ser. No. 700,726, Jan. 26, 1968, abandoned.

[52] U.S. Cl. .......... 117/201, 117/161 ZB, 264/272, 317/234 E

[51] Int. Cl. .......... H01l 7/00

[58] Field of Search .......... 260/37 EP, 47 EP; 117/161 ZB, 201, 161 ZA; 317/234 E; 264/272; 252/316

[56] References Cited

UNITED STATES PATENTS

| | | | |
|---|---|---|---|
| 2,978,435 | 4/1961 | Ernst | 260/47 |
| 3,444,614 | 5/1969 | Scholer | 29/588 |
| 3,447,975 | 6/1969 | Bilo | 148/33.3 |
| 3,449,641 | 6/1969 | Lee | 264/272 |
| 3,533,985 | 10/1970 | Lantz | 260/37 |
| 3,564,109 | 2/1971 | Reuchardt | 174/15 |
| 3,566,208 | 2/1971 | Wang | 317/234 |
| 3,597,269 | 8/1971 | Chang | 117/213 |
| 3,601,667 | 8/1971 | Desmond | 317/234 E |
| 3,609,471 | 9/1971 | Scace | 317/234 E |
| 3,684,592 | 8/1972 | Chang | 117/201 |

OTHER PUBLICATIONS

Union Carbide CSB 15–7A, Silicones, Customer Service Bulletin. 1964 pg, 1, 3, & 4.

Union Carbide PIB 15–12, Silicone, Product Information Bulletin (1965) pg. 1 & 12.

Harper, Electronic Packaging with Resins, McGraw Hill Co. (1961) pg. 31, 37, & 76 (TK 7870H28)

*Primary Examiner*—Leon D. Rosdol
*Assistant Examiner*—Michael F. Esposito
*Attorney, Agent, or Firm*—Howard E. Thompson, Jr.

[57] ABSTRACT

Encapsulant compositions for transistors and other semiconductor assemblages consisting essentially of an epoxy resin system having good electrical insulating properties and selected from the group consisting of amine cured, phenolic cured and anhydride cured epoxy resin systems containing 0 to 70 percent by weight of inorganic filler, and having uniformly blended with the resin and/or filler components about 0.1 to 5 percent, and preferably about 0.3 to 3 percent of a lower alkyl di- or tri-lower alkoxy silane having a substituent in the alkyl group which is reactive with epoxy resin systems and selected from the group consisting of amine and epoxy substituents. The silane is suitably introduced by blending with the resin or precoating on the filler component, and the small amount of silane so enhances the insulating properties and durability of the encapsulant as to eliminate the need for prior treatment or passivation of the semiconductor assemblage.

20 Claims, No Drawings

ENCAPSULANT COMPOSITIONS FOR SEMICONDUCTORS

REFERENCE TO RELATED APPLICATIONS

This application is a streamlined continuation of Ser. No. 65,272, filed Aug. 19, 1970, now abandoned, which in turn was a continuation of Ser. No. 700,726, filed Jan. 26, 1968, now abandoned.

BACKGROUND OF THE INVENTION

Semiconductor assemblages such as transistors have extremely delicate electrical connections, and to protect these connections these assemblages are frequently encapsulated in thermosetting plastic materials. Most encapsulating plastics are found to poison the semiconductor or damage the assemblage; or to use the trade expression, the plastic is incompatible with the device. Sometimes incompatibility is immediately evident by the inoperability or inferior operation of the device. More often it shows only after the device has been stressed by heavy load. Damage or failure in a device can be readily apparent through the device becoming open electrically, i.e., failure of one or more of the delicate connections due to corrosion. On the other hand, the device may continue to function but with a marked change in its electrical characteristics.

In order to counteract incompatibility it has been common practice to passivate the device before it is encapsulated with resin. The passivation generally comprises coating the tiny semiconductor chip with a tiny drop of extremely pure liquid silicone rubber and then curing this rubber at high temperature for several hours. This is an inherently slow and costly operation. On the other hand the step of molding the devices in a protective body of encapsulant is fast and efficient. There has been a longfelt need, therefore, for an encapsulating composition which is sufficiently compatible with the semiconductor assemblage to permit elimination of the separate passivating step.

It has now been discovered that epoxy resin systems which have good electrical insulating properties can be made compatible with semiconductor devices by incorporating in the resin composition a small amount of an epoxy reactive silane. By epoxy reactive silane is meant silanes having groups such as epoxy groups, or amine groups which normally enter into epoxide polymerization reactions.

In general the silanes suitable for use in the new compositions can be described as lower alkyl dir- or tri-lower alkoxy silanes having a substituent in the alkyl group which is reactive with epoxy resin systems and selected from the group consisting of amine and epoxy substituents. More particularly a suitable silane can be described as a substituted lower alkyl poly-lower alkoxy silane reactive with epoxy resin systems and having the formula

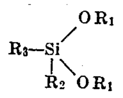

where $R_1$ is $C_1$ to $C_3$ alkyl, $R_2$ is selected from the group consisting of $C_1$ to $C_3$ alkyl and $—OR_1$, and $R_3$ is a $C_2$ to $C_4$ alkyl group having an epoxy reactive substituent selected from the class consisting of substituents containing an active epoxy group, and substituents containing an active amine group.

Typical silanes answering this description which are commercially available include:

a. beta (3,4-epoxycyclohexyl) ethyl trimethoxy silane b. gamma-glycidoxypropyl trimethoxy silane c. gamma-aminopropyl triethoxy silane d. N-(beta-aminoethyl)-gamma-aminopropyl trimethoxy silane e. N-(beta-aminoethyl) gamma amino isobutyl, methyl dimethoxy silane f. N-beta carbomethoxy ethyl, N′ gamma trimethoxy silyl propyl, ethylene diamine (an adduct of item *d* with methyl acrylate)

The amount of silane employed should be about 0.05 to 5.0 percent, and preferably about 0.3 to 3 percent by weight based on the overall weight of the encapsulating composition.

The encapsulating composition can be either a liquid epoxy resin system or a solid or powdered system, and while such systems may be unfilled, they will generally contain finely divided silica, quartz, or other inorganic filler in proportions as high as 70 percent, and suitably in the range of 45 to 70 percent of the overall weight of the composition. The silane can be uniformly distributed throughout the composition in various ways, as, for example, by dissolving in the resin or by pre-coating on a filler employed in the composition.

When pre-coating the filler component, the silane can be applied to the filler from aqueous suspension or directly by tumbling the filler and silane in the desired ratio for about 6 to 8 hours. The silane is very substantive, and either procedure provides effective uniform coating of the filler. The amount of silane to be employed in such coating procedures may vary considerably, as, for example, within the range of about 0.25 to 5 percent by weight based on the weight of filler in providing the desired amount of silane in the overall composition.

The advantageous effect of the small amount of silane in epoxy resin systems for encapsulating of semiconductors can be demonstrated by comparison of various electrical characteristics thereof. One of the most extensively used types of semiconductor assemblages are transistors, and standard tests have been developed for evaluating and comparing performance of transistors.

A versatile apparatus for measuring and evaluating the characteristics of transistors is the Tetronix Type 575 Transistor Curve Tracer. On this apparatus values which can be readily determined include:

$\beta$ or ΔIc/ΔIb — where ΔIc is the change of collector current caused by the change of base current ΔIb.

Vce Sat. — Saturation voltage between collector and emitter.

BVebo — Breakdown voltage between emitter and base.

BVcbo — Breakdown voltage between collector and base.

Iceo — Current flow from collector to emitter.

Icbo — Reverse leakage current between collector and base.

One of the most informative of the characteristics listed above is the value and change of $\beta$; and data presented in the examples hereinafter appearing is based primarily on the values of $\beta$. Furthermore, in the examples values for $\beta$ have been determined after stressing specimen transistors by techniques which are intended to simulate accelerated aging in use. One test which will be employed in the examples hereinafter appearing determines change in operating characteristics after stressing the device by an applied voltage equal to about one-half the operating voltage, but in the opposite direction to the normal operation of the device, and at an elevated temperature. This test, which will be referred to as the high temperature reverse bias test, and unless otherwise indicated in the examples hereinafter appearing the test conditions involve about 40 volt reverse bias at 185°C. for 17 to 24 hours.

Another test which will be referred to in the examples hereinafter appearing is the boiling water test. The operation of a device should not be importantly changed by 100 hours in boiling water, or the approximate equivalent of 30 to 35 hours in a pressure cooker at 15 p.s.i. The common failure of the boiling water test is for the device to become open electrically, apparently due to corrosion and breakage of one of the delicate connections. It is also helpful in the boiling water test to determine changes in the value of $\beta$, as a measure of changes which are short of complete failure of the device.

The manner in which the silane in the new compositions enhances performance of transistors and the like is not completely understood, but it appears that the silane performs a combination of functions. By way of illustration transistors encapsulated with certain amine cured epoxy systems show fair performance in the high temperature reverse bias test, but poor results in the boiling water test. In these systems the presence of silane provides a marked improvement in the boiling water resistance. Transistors encapsulated with certain phenolic cured epoxy resins show fair resistance to boiling water and poor performance in the high temperature reverse bias test, but the latter performance is greatly improved by the presence of silane in the encapsulating composition. Anhydride cured epoxy resin systems as semiconductor encapsulants generally show poor performance in both the boiling water and high temperature reverse bias tests, but with silane present in the composition anhydride cured systems have been much improved in both of these tests.

While the basic formulation of encapsulating compositions having good electrical properties is well known in the art, and provides no part of the present invention, it should be noted that the improvement realized by the inclusion of small amounts of an epoxy reactive silane applies to both liquid epoxy resin systems and solid epoxy resin molding compositions, the latter being fluidized by the application of heat to facilitate molding or casting, and being cured and hardened by continued application of heat. In the basic epoxy resin systems it is practical to employ bisphenol A resins having epoxy equivalent weights (EEW) in the 170 to 2000 range, epoxy novolac resins having epoxy equivalent weights in the range of about 155 to 240, and mixtures thereof. Whether a system will be liquid or solid will depend in part on the nature of the resin and in part on the nature and amount of the curing agent. Furthermore, a two-component liquid system may be sufficiently viscous so that heating of one or both components is desirable to facilitate mixing. With any liquid or solid system the important thing in encapsulating is to provide, with heating if necessary, a free flowing mass which will readily fill mold cavities and envelop small parts being encapsulated.

As earlier mentioned, the invention is applicable to phenolic, amine and anhydride cured systems. Typical phenolic curing agents include phenolic novolac resins having a melting point of about 120° to 130° F. Amine curing agents include di- and poly-amines generally, with typical examples of satisfactory amines being methylene dianiline, meta phenylene diamine, and isophorone diamine. Anhydride curing agents include mono- and di- anhydride types such as phthalic anhydride, tetrahydrophthalic anhydride, tetrachlorophthalic anhydride, hexahydrophthalic anhydride, benzophenone dianhydride, pryomellitic dianhydride, cyclopentane dianhydride, succinic anhydride, and trimellitic anhydride. The amount of curing agent is suitably within the range of about 0.8 to 1.1 equivalents per epoxy equivalent of resin, although with the phenolic curing agents it is sometimes desirable to use amounts approaching 2 equivalents per epoxy equivalent of resin.

In the use of encapsulating compositions an important property is for the composition to gel rapidly at molding or casting temperature. It is therefore desirable with most of the curing agents to employ small amounts of activator or catalyst. Effective catalysts include tertiary amines such as 2 methyl imidazole, a $BF_3$ amine complex such as $BF_3$ aniline complex, triphenyl sulfonium chloride, tri-dimethylaminomethyl phenol, and triphenylphosphine.

Filler components such as finely divided silica, quartz, calcium silicate, barium sulfate, hydrated alumina and the like preferably make up about 50 to 60 percent of the complete composition. Such fillers, together with coloring agents, mold release agents and other trace modifiers are suitably blended with the resin component or divided between the resin and hardener components. In solid resin systems, however, it is sometimes practical to dry mix the several components, pelletize the mixture, and re-grind to a powder having particles of uniformly mixed composition.

The following examples show the comparative results, with and without silane additive, for a number of different epoxy resin systems, but it is to be understood that these examples are given by way of illustration and not of limitation.

EXAMPLE I

A two-component encapsulating composition was prepared containing

Part A 30 percent novolac resin EEW 175, viscosity 1500 cps at 125° C.

70 percent finely divided quartz

Part B 99.7 percent phenolic novolac resin M.P. 125° F. sp. gr. 1.27

0.3% ethyl methyl imidazole

A second composition was prepared changing the 70 percent quartz in Part A to 70% of powdered quartz coated with 5 percent of its weight of gamma-aminopropyl triethoxy silane. (Coating was effected by tumbling the quartz and silane for about 8 hours and then drying for one hour at 150° C.)

The mixing ratio for these compositions is 100/18, Part A/Part B. Parts A and B are separately heated to 100° C., mixed in the above proportion, deaired, and cast at 125° C. in molds containing transistors. The gel time at 125° C. is about 90 minutes and complete cure is effected by heating at 180° C. for about 12 hours.

Five transistors encapsulated with each of these compositions were subjected to the high temperature reverse bias test above described with the following values for Beta:

| Encapsulated without silane | | | | | |
|---|---|---|---|---|---|
| | Sample | | | | |
| Time | 1 | 2 | 3 | 4 | 5 |
| Initial | 23 | 51 | 22 | 43 | 47 |
| 1 hour | <5 | <5 | <5 | <5 | <5 |

| Encapsulated with silane | | | | | |
|---|---|---|---|---|---|
| | Sample | | | | |
| Time | 1 | 2 | 3 | 4 | 5 |
| Initial | 165 | 160 | 160 | 160 | 160 |
| 1 hour | 82 | 112 | 100 | 50 | 100 |
| 3 hours | 44 | 104 | 96 | 62 | 94 |
| 5 hours | 56 | 102 | 94 | 68 | 94 |
| 22 hours | 66 | 106 | 100 | 82 | 108 |

These comparative results show a marked improvement in compatibility when the silane is present. In tests with other specimens it was found that the boiling water resistance was reasonably good with the control compositions, but somewhat better with the silane containing compositions.

In other tests with similar resin compositions employing finely ground silica as filler excellent results were obtained using silane in the proportion of 2.5 percent of the weight of filler. Furthermore, equally good results were obtained when substituting other silanes, including previously described silanes, *b*, *d*, *e*, and *f*, as the filler coating.

Transistors encapsulated with the above mentioned silane containing compositions have consistently tolerated 50 to 60 hours of pressure cooking, which is comparable to more than 200 hours exposure to boiling water.

EXAMPLE II

Two similar molding powders were prepared having the following composition in parts by weight:

| Component | A Without Silane | B With Silane |
|---|---|---|
| Epoxy novolac resin EEW 230, Soft. Pt. 75° C. | 19.70 | 15.45 |
| Epoxy novolac resin EEW 215, Soft. Pt. 90° C. | 10.00 | 13.50 |
| Gamma aminopropyl triethoxy silane | — | .45 |
| Colloidal silica | .20 | .60 |
| Barium Sulfate, powdered | 50.25 | 50.75 |
| Hydrated Alumina, powdered | 10.0 | 10.0 |
| Carbon black | .85 | .5 |
| Methylene dianiline | 6.50 | 6.50 |
| $BF_3$ aniline complex | 1.0 | 1.25 |
| Glycerol monostearate | 1.0 | — |
| Calcium stearate | .5 | 1.00 |
| Mold cycle at 300°F. | 45 sec. | 90 sec. |

In mixing composition A the resins and colloidal silica are first ground together. The other components are then added and blended to a uniform powder which is pelletized and reground to a particle size which passes through a 6 mesh and is retained by an 84 mesh screen.

In mixing composition B the two resins were fused together at about 150° C. and the melt deaired by vacuum. The silane (a liquid) was added to the melt, mixed a few minutes, and then cooled to solidify. The cake was crushed, ground with colloidal silica and the resulting powder blended with other components, and processed as described for composition A.

A number of substantially identical transistors supplied by a large manufacturer of electronic devices were encapsulated with compositions A and B and subjected to high temperature reverse bias tests and boiling water tests as above described.

All of the devices tested were compatible under the high temperature reverse bias test. Typically they lost from 0 to 25 percent of their beta value after 17 hours at 185° C. under a reverse bias of 40 volts. Thus powders A and B were about equivalent in this test.

All of the devices molded with powder A and subjected to the boiling water test failed this test in less than 100 hours. Typically they failed as electrically open after 50 to 75 hours in boiling water.

All of the devices molded with powder B and subjected to the boiling water test survived 100 hours without any change. Other samples were tested in a pressure cooker at 15 pounds pressure and survived 400 hours of pressure cooking without failure and with very little change in beta value. One hour in the pressure cooker compares in severity with about 3 hours of boiling. Thus these samples withstood the equivalent of 1200 hours of boiling; and it is apparent that the silane in powder B has vastly improved the encapsulating composition.

EXAMPLE III

A two-component liquid amine cured epoxy resin encapsulant composition is prepared having the following composition:

| | |
|---|---|
| Part A | |
| 18.96% | Liquid bisphenol A resin EEW 189, Viscosity 12,000 cps at 25° C. |
| 19.38% | Epoxy novolac resin EEW 230, Softening point 75° C. |
| 1.18% | Carbon black |
| .48% | Colloidal silica |
| 60.00 | Powdered silica |
| Part B | |
| 96.50% | Methylene dianiline |
| 3.50% | $BF_3$ — aniline complex |
| Mixing ratio | 100/7.5, Part A/Part B |

In mixing part A the two resins are mixed at 100° C. until uniform, then the other components are blended in. Part B is also heated to 100° C. and mixed until uniform.

A second composition is prepared identical to the first except that in Part A the powdered silica is replaced by silane treated powdered silica obtained by adding one part by weight of beta (3,4 epoxy cyclohexyl) ethyltrimethoxy silane to 20 parts of powdered silica and tumbling for about 10 hours, and then drying for one hour at 150° C.

A number of transistors were encapsulated with each of these compositions. Parts A and B were heated to about 80° C., mixed well, deaired quickly under vacuum (the gel time at 80° C. is about 5 minutes). It is then cast into molds preheated to 125° C. and the transistors on positioning jigs are inserted into the resin. The temperature is held at 125° C. for 15 to 30 minutes and complete cure is effected by heating overnight at 180° C.

When subjected to high temperature reverse bias tests and boiling water tests the following comparative beta values are obtained:

High temperature reverse bias

| Time | Without Silane | | | | | | With Silane | | | | | |
|---|---|---|---|---|---|---|---|---|---|---|---|---|
| | 1 | 2 | 3 | 4 | 5 | 6 | 1 | 2 | 3 | 4 | 5 | 6 |
| Initial | 80 | 56 | 37 | 27 | 32 | 130 | 64 | 125 | 125 | 130 | 130 | 135 |
| 1 hour | 80 | 54 | 36 | 27 | 32 | 125 | 60 | 115 | 110 | 120 | 115 | 125 |
| 3 hours | 80 | 54 | 37 | 28 | 34 | 115 | 60 | 115 | 105 | 115 | 105 | 110 |
| 5 hours | 78 | 54 | 38 | 28 | 34 | 110 | 60 | 110 | 105 | 115 | 110 | 115 |
| 22 hours | 80 | 54 | 38 | 27 | 32 | 110 | 60 | 105 | 100 | 104 | 100 | 100 |

Boiling water

| Time | Without Silane | | | | | | With Silane | | | | | |
|---|---|---|---|---|---|---|---|---|---|---|---|---|
| | 1 | 2 | 3 | 4 | 5 | 6 | 1 | 2 | 3 | 4 | 5 | 6 |
| Initial | 132 | 54 | 37 | 80 | 27 | 33 | 30 | 121 | 124 | 84 | 120 | 132 |
| 30 hours | 68 | 54 | 36 | 29 | 27 | 34 | 32 | 136 | 130 | 88 | 115 | 120 |
| 76 hours | open | 28 | open | open | open | 34 | 30 | 126 | 124 | 86 | 120 | 125 |
| 100 hours | — | open | — | — | — | open | 32 | 130 | 122 | 86 | 120 | 125 |

Here again the composition without silane is satisfactory under the high temperature reverse bias test but poor under the boiling water test, and resistance to boiling water is greatly improved by the silane.

In other tests the coated filler of the foregoing example was replaced with an equivalent weight of powdered quartz which had been silane coated by vigorously agitating 200 parts by weight of quartz in a mixture of 10 parts gamma aminoproplyl triethoxy silane and 2000 parts of distilled water for about 1 hour, filtering, and drying for 1 hour at 150°C. The results when using this type of coated filler correspond with those obtained with filler coated by tumbling.

EXAMPLE IV

A liquid, two-component, phenolic novolac cured epoxy system is prepared containing:

Part A 30 percent Epoxy novolac resin EEW 172–179, Viscosity 1700 at 125° F.

70 percent Finely ground silica (The resin is heated to 125°C and the silica is mixed in well)

Part B 99.70 percent Phenolic novolac resin M.P. 125°F.

0.30 percent 2-methyl imidazole (The resin is heated to 70°C. and the amine is mixed in well)

In using this composition the mixing ratio should be 100/18, Part A/Part B. Part B at about 80°C. is added to Part A at 100°–125° C. and mixed in well, quickly deaired, and cast in preheated molds at 125° C. Transistor devices on a positioning jig are inserted into the resin which gels in about 15 minutes at 125° C. Encapsulated transistors are cured one-half hour at 125°C. and overnight at 180° C. Five each of the encapsulated transistors were subjected to high temperature reverse bias tests and boiling water tests with the results tabulated below for composition IV*a*.

A slightly modified composition was prepared in which the silica in Part A is replaced with silica coated with 5 percent of its weight of gamma aminopropyl triethoxy silane. Transistors encapsulated with this composition were tested as described, giving the results tabulated below for composition IV*b*.

Another modified composition was prepared in which the silica was coated with 5 percent of beta (3,4 epoxy cyclohexyl) ethyl trimethoxy silane. Transistors encapsulated with this composition were tested as described, giving the results tabulated below for composition IV*c*.

Beta values — boiling water test

| | | | | | |
|---|---|---|---|---|---|
| Composition IV*a* | | | | | |
| Initial | 140 | 140 | 150 | 140 | 142 |
| 30 hours | 115 | 130 | 140 | 125 | 135 |
| 76 hours | 130 | 150 | 140 | 130 | 150 |
| 100 hours | open | 190 | 140 | open | 220 |
| Composition IV*b* | | | | | |
| Initial | 150 | 160 | 132 | 154 | 160 |
| 30 hours | 150 | 150 | 125 | 150 | 158 |
| 76 hours | 150 | 160 | 115 | 150 | 156 |
| 100 hours | 132 | 160 | 110 | 150 | 156 |
| Composition IV*c* | | | | | |
| Initial | 50 | 42 | 52 | 48 | 50 |
| 30 hours | 52 | 44 | 54 | 50 | 50 |
| 76 hours | 50 | 46 | 50 | 48 | 48 |
| 100 hours | 51 | 45 | 49 | 47 | 48 |

Although the boiling water resistance for composition IV*a* is reasonably good, it is considerably better with the silane treated compositions IV*b* and *c*.

Beta values — reverse bias test

| | | | | | |
|---|---|---|---|---|---|
| Composition IV*a* | | | | | |
| Initial | 115 | 106 | 92 | 87 | 110 |
| 1 hour | < 5 | < 5 | 42 | < 5 | < 5 |
| 3 hours | | | < 5 | | |
| Composition IV*b* | | | | | |
| Initial | 115 | 115 | 122 | 111 | 115 |
| 1 hour | 88 | 72 | 68 | 112 | 68 |
| 3 hours | 58 | 66 | 60 | 100 | 64 |
| 5 hours | 56 | 64 | 60 | 60 | 60 |
| 22 hours | 54 | 64 | < 5 | 64 | 27 |
| Composition IV*c* | | | | | |
| Initial | 96 | 100 | 95 | 100 | 98 |
| 1 hour | <10 | 66 | 90 | 52 | 66 |
| 3 hours | | 46 | open | 42 | 64 |
| 5 hours | | 36 | | 34 | 60 |
| 22 hours | | 27 | | 36 | 42 |

Composition IV*a* shows very poor compatibility. The compatibility is most improved with the addition of amino silane, composition IV*b*. While composition IV*c* containing epoxy silane is not as good as composition IV*b*, it is considerably better than composition IV*a* which contains no silane.

EXAMPLE V

A phenolic novolac cured epoxy molding powder is prepared as follows: 62 parts of epoxy novolac resin EEW 178, viscosity 35,000 cps at 125° F. is heated to 235° F. and 35.5 parts of phenolic novolac M.P. 125° F. and 2.5 parts of glycerol monostearate are stirred into the hot resin until homogeneous. The mixture is then cooled, broken and ground to a powder.

A complete formulation is then prepared by combining, in parts by weight

| | | |
|---|---|---|
| 28.50 | parts | Above resin mixture |
| .25 | do. | Glycerol monostearate |
| .50 | do. | Carbon black |
| 2.00 | do. | Chopped glass fiber |
| 20.00 | do. | Aluminum silicate powder |
| 46.85 | do. | Powdered silica |
| 1.75 | do. | Tetrachlorophthalic acid salt of 2 methyl imidazole |
| .15 | do. | calcium silicate |

After dry blending the mixture is pelletized and reground to minus six mesh. This powder molds well in 2.5 minutes at 165° C. and is completely cured by heating overnight at 180° C.

A second composition was prepared in the same manner except that the silica employed was first coated with 2.5 percent of its weight of beta (3,4-epoxycyclohexyl) ethyltrimethoxy silane. This powder Vb molded and cured as described for the first powder Va.

A number of transistors were encapsulated with each of these compositions and subjected to pressure cooker, and high temperature reverse bias tests. All specimens with both compositions survived 50 hours in the pressure cooker at 15 p.s.i. without notable change in their operating characteristics.

The high temperature reverse bias tests showed the following comparative values for beta:

| | | | | | |
|---|---|---|---|---|---|
| Composition V*a* | | | | | |
| Initial | 54 | 82 | 80 | 27 | 78 |
| 17 hours | 52 | <5 | <5 | 26 | <5 |
| Composition V*b* | | | | | |
| Initial | 84 | 86 | 84 | 86 | 86 |
| 5 hours | 86 | 72 | 80 | 80 | 82 |
| 22 hours | 78 | 80 | 80 | 80 | 82 |

The silane has caused a great improvement in compatibility. The results are further illustrated by the following tabulation of changes in leakage current after high temperature reverse bias stress, in amperes. In the tabulation the factor (times $10^{-10}$) has been omitted.

| | | | | | |
|---|---|---|---|---|---|
| Composition V*a* | | | | | |
| Initial | 16 | 12 | 18 | 26 | 8.3 |
| 17 hours | 32 | 820 | 34 | 32 | 320 |
| (The leakage current increased in every case, grossly in two) | | | | | |
| Composition V*b* | | | | | |
| Initial | 10 | 10 | 20 | 20 | 20 |
| 1 hour | 8 | 8 | 6 | 6 | 5 |
| 5 hours | 1 | 1 | 8 | 8 | 0.2 |
| 22 hours | 6 | 6 | 8 | 8 | 6 |

(There is obviously no increase in leakage current; in fact the devices appear to improve)

EXAMPLE VI

A two-component anhydride cured system was prepared having the following composition Part A 30 percent epoxy novolac resin EEW 175 Viscosity 1700 cps at 125° F.

70% powdered silica

Part B 84.17 percent Hexahydrophthalic anhydride 13.33 percent Methyl nadic anhydride 2.50 percent Triphenyl sulfonium chloride Parts A and B are mixed in a 100/23.6 ratio at about 100° C., deaired and cast in molds heated to 125° C. Gel time at 125° C. is about 6 minutes. Cure 30 minutes at 125° C. plus overnight (16–18 hours) at 180° C.

A separate, two-component composition VI*b* is prepared identical with VI*a* except that the silica in Part A is coated with 3 percent of its weight of beta (3,4-epoxycyclohexyl) ethyltrimethoxy silane.

Transistors encapsulated with composition VI *a* and VI *b* were tested by high temperature reverse bias and pressure cooker tests with the following comparative beta values.

| | | | | | |
|---|---|---|---|---|---|
| Reverse Bias | | | | | |
| Composition VI*a* | | | | | |
| Initial | 154 | 158 | 126 | 83 | 132 |
| 1 hour | 27 | 73 | 108 | 55 | 90 |
| 3 hours | open | open | open | open | 72 |
| 5 hours | | | | | 172 |
| 22 hours | | | | | <10 |
| Reverse Bias | | | | | |
| Composition VI*b* | | | | | |
| Initial | 66 | 66 | 68 | 70 | 70 |
| 1 hour | 64 | 60 | 60 | 68 | 64 |
| 3 hours | 62 | 60 | 54 | 68 | 62 |
| 5 hours | 60 | 62 | 54 | 64 | 62 |
| 22 hours | 60 | 62 | 54 | 64 | 62 |
| Pressure Cooker — 15 psi. | | | | | |
| Composition VI*a* | | | | | |
| Initial | 72 | 68 | 70 | 72 | 82 |
| 16 hours | 70 | 68 | 70 | 72 | 76 |
| 32 hours | open | open | open | open | open |
| Composition VI*b* | | | | | |
| Initial | 68 | 70 | 70 | 68 | 70 |
| 15 hours | 68 | 70 | 70 | 68 | 70 |
| 30 hours | 68 | 72 | 72 | 70 | 72 |
| 41 hours | 68 | 72 | 72 | 70 | 72 |
| 56 hours | 68 | 68 | 70 | 68 | 68 |

The presence of silane in the encapsulant has substantially improved both the hot water resistance and the compatibility, and the test results with composition VI*b* approach perfection.

EXAMPLE VII

A molding powder VII*a* is prepared by dry mixing the following components:

| | | |
|---|---|---|
| 21.0 | parts | Bisphenol A epoxy resin EEW 600, softening pt. 85°C. |
| 5.0 | parts | Epoxy novolac resin EEW 220, softening pt. 175°F. |
| .4 | parts | Carbon black |
| 1.5 | parts | Calcium stearate |
| .1 | part | 2 — Methylimidazole |
| .75 | parts | Glycerol monostearate |
| 49.35 | parts | Powdered silica |
| 10.0 | parts | ¼' chopped glass fiber |
| 11.9 | parts | tetrachlorophthalic anhydride, — powdered |

A second powder VII*b* is prepared identical with VII*a* except that the powdered silica is coated with 2.5 percent of its weight of beta (3,4-epoxycyclohexyl) ethyltrimethoxy silane.

Transistors are encapsulated with these compositions by transfer molding. At transfer pressure of 700 psi and temperature of 300° F. the molding time is 2 minutes; and complete cure is effected by heating overnight at 180° C. Tests of these transistors gave the following results:

| | | | | | |
|---|---|---|---|---|---|
| Beta — Pressure cooker 15 psi | | | | | |
| Composition VII*a* | | | | | |
| Initial | 115 | 124 | 118 | 120 | 121 |
| 16 hours | 115 | 122 | 118 | 120 | 118 |
| 33 hours | open | open | open | open | open |
| Composition VII*b* | | | | | |
| Initial | 111 | 112 | 110 | 112 | 115 |
| 17 hours | 110 | 115 | 110 | 120 | 115 |
| 32 hours | 105 | 110 | 105 | 110 | 110 |
| 47 hours | 107 | 107 | 105 | 109 | 108 |
| Beta — High temperature reverse bias | | | | | |
| Composition VII*a* | | | | | |
| Initial | 122 | 134 | 128 | 120 | 116 |
| 3 hours | 110 | 128 | 116 | 116 | 116 |
| 5 hours | 89 | 124 | 26 | 44 | 85 |
| 18 hours | 48 | 72 | < 5 | 13 | 30 |
| Beta — High temperature reverse bias | | | | | |
| Composition VII*b* | | | | | |
| Initial | 86 | 84 | 84 | | |
| 1 hour | 76 | 70 | 70 | | |
| 3 hours | 72 | 58 | 84 | | |
| 5 hours | 68 | 54 | 58 | | |
| 22 hours | 29 | 23 | 20 | | |

Here again the presence of the silane shows considerably improved results following both test procedures.

EXAMPLE VIII

An amine cured two-component liquid epoxy resin system without filler is prepared containing:

Part A 49.5 percent Bisphenol A resin, EEW 180

50.5 percent Epoxy cresol novolac resin, EEW 230, Durrans softening point 76° C. (Mixed at 100° C.)

Part B 96.5 percent Methylenedianiline 3.5 percent $BF_3$ complex of aniline (Mix at about 110° C.)

Mix 24.3 parts of B at 100°–110° C. with 100 parts of A at 80° C., deair rapidly (the gel time is 4 to 5 minutes at 80° C.) and cast transistors in molds heated to 125° C. Cure 15 minutes at 125° C. and overnight at 180° C. These transistors gave the following test results:

Performance — Beta

| High temp. — Reverse Bias | | | | | Boiling Water | | | | |
|---|---|---|---|---|---|---|---|---|---|
| Initial | 49 | 22 | 35 | 45 | Initial | 54 | 25 | 31 | 37 |
| 1 hour | 48 | 22 | 35 | 45 | 30 hours | open | 24 | open | 37 |
| 3 hours | 48 | 23 | 35 | 44 | 76 hours | | open | | open |
| 5 hours | 50 | 23 | 32 | 42 | | | | | |
| 22 hours | 49 | 22 | 28 | 32 | | | | | |

A similar system was prepared in which Part A was changed to

Part A'

48.96 percent Bisphenol A resin EEW 180

50.04 percent Epoxy cresol novolac resin, EEW 230, Softening point 76°C.

1.0 percent beta (3,4 epoxy cyclohexyl) ethyl trimethoxy silane (Mix resins at 100° C., then add silane with continued mixing)

Part A' and Part B (above) are mixed in the manner and proportions above described, and transistors are molded with the composition. These transistors gave the following test results:

Performance — Beta

| Reverse Bias | | | | | Boiling Water | | | | |
|---|---|---|---|---|---|---|---|---|---|
| Initial | 125 | 125 | 125 | 125 | Initial | 64 | 60 | 64 | 64 |
| 3 hours | 105 | 125 | 105 | 110 | 30 hours | 62 | 60 | 60 | 62 |
| 20 hours | 110 | 125 | 105 | 110 | 70 hours | 70 | 60 | 64 | 64 |
| | | | | | 100 hours | 68 | 60 | 64 | 64 |

It is significant that the improvement in resistance to boiling water due to the added silane is as pronounced in this unfilled system as it is in the filled systems of the earlier examples. While it would not generally be economically practical to use unfilled epoxy resin systems in the commercial encapsulation of transistors, the unfilled systems could be highly advantageous in other semiconductor assemblages.

The foregoing examples show the distinct advantage of very small amounts of epoxy reactive silanes in epoxy resin systems for encapsulating semiconductors. Other silanes such as vinyl trimethoxy silane and methyl trimethoxy silane, all characterized as not reactive with epoxy groups, have been tested in similar epoxy resin systems but these showed none of the advantageous results obtained with epoxy reactive silanes.

It follows, therefore, that when considering the possible suitability of silanes other than those embodied in the foregoing examples, the presence or absence of epoxy reactive groups is an important guide to fruitful selection.

It should be pointed out that with the costly and time consuming procedure currently employed, involving passivation of semiconductors prior to encapsulation, there is considerable difference in the performance of the encapsulated devices, and it is common practice to grade transistors or the like according to such performance differences. Transistors encapsulated with silane containing epoxy resins as shown in the foregoing examples compare favorably in performance with the better grades of conventional (passivated) transistors. Thus the present invention paves the way for substantial economies in the production of transistors and other encapsulated semiconductor devices by eliminating the need for the separate passivation step.

When considering the foregoing examples it is important to bear in mind that differences in the starting beta values from one device to another should not be confused with changes in values of beta as a particular device is subjected to stress. Semiconductor scips vary widely and inevitably in their initial gain or beta value. Indeed such differences provide a basis for assigning individual transistors to particular end uses.

No matter whether the initial gain or beta value of a semiconductor chip is high or low, the extent to which such initial value is modified by stresses or environmental change provides most useful information concerning relative durability of semiconductor devices. A poor encapsulating system will destroy a device of high initial beta just as certainly as it will destroy a device of low initial beta. On the other hand, with a good encapsulating system a device with a low starting beta value will be just as stable as one with a high starting beta value.

Various changes and modifications in the silane containing epoxy resin compositions herein disclosed will occur to those skilled in the art, and to the extent that such changes and modifications are embraced by the appended claims, it is to be understood that they constitute part of the present invention.

What is claimed is:

1. A method for improving the electrical insulating properties and compatibility of semiconductor devices that comprises directly, and without passivation, encapsulating said semiconductor devices with an encapsulant consisting essentially of an uncured epoxy resin; a curing agent for said epoxy resin selected from the group consisting of amine, phenolic novolacs and anhydrides; and from about 0.05 to 5 percent by weight based upon the total weight of said encapsulant of a lower alkyl poly-lower alkoxy silane having a substituent in the alkyl group reactive with said epoxy resin and being a member selected from the group consisting of amine and epoxy substituents; and, curing said encapsulant, said silane imparting enhanced compatibility between said epoxy resin and the components of said semiconductor devices such that said encapsulated semiconductor devices are resistant to failure under reverse bias at high temperature and resistant to change when subjected to boiling water.

2. The method of claim 1 wherein said silane is beta (3,4-epoxycyclohexyl) ethyl trimethoxy silane.

3. The method of claim 1 wherein said silane is gamma-glycidoxypropyl trimethoxy silane.

4. The method of claim 1 wherein said silane is gamma-aminopropyl triethoxy silane.

5. The method of claim 1 wherein said silane is N-(beta-aminoethyl)-gamma-aminopropyl trimethoxy silane.

6. The method of claim 1 wherein said silane is N-(beta-aminoethyl) gamma-aminoisobutyl, methyl dimethoxy silane.

7. The method of claim 1 wherein said silane is present in said encapsulant in an amount of from about 0.3 to 3 percent by weight.

8. The method of claim 1 wherein said encapsulant is a powdered system capable of being fluidized by applying heat thereto enabling it to be subsequently molded.

9. The method of claim 1 wherein said epoxy resin is fluidized and contains said silane blended therein.

10. The method of claim 1 wherein said encapsulated semiconductor devices exhibit a change in $\beta$ value no greater than about 30 percent of their original values when subjected to reverse bias at a temperature of about 185°C and up to about one-half of their rated breakdown voltage for a period of from about 10 to 20 hours.

11. An encapsulated semiconductor device comprising an assemblage of semiconductor and associated electrical leads having encapsulant applied directly thereto, without prior passivation, said encapsulant consisting essentially of an uncured epoxy resin; a curing agent for said epoxy resin selected from the group consisting of amines, phenolic novolacs and anhydrides; and, from about 0.05 to 5 percent by weight based upon the total weight of said encapsulant of a lower alkyl poly-lower alkoxy silane having a substituent in the alkyl group reactive with said epoxy resin and being a member selected from the group consisting of amine and epoxy substituents, said silane imparting enhanced compatibility between said epoxy resin and the components of said semiconductor device and providing good compatibility and electrical insulating properties for said semiconductor device such that said encapsulated semiconductor device is resistant to failure under reverse bias at high temperature and resistant to change when subjected to boiling water.

12. The encapsulated semiconductor device of claim 11 wherein said silane is beta (3,4-epoxycyclohexyl) ethyl trimethoxy silane.

13. The encapsulated semiconductor device of claim 11 wherein said silane is gamma-glycidoxypropyl trimethoxy silane.

14. The encapsulated semiconductor device of claim 11 wherein said silane is gamma-aminopropyl triethoxy silane.

15. The encapsulated semiconductor device of claim 11 wherein said silane is N-(beta-aminoethyl)-gamma-aminopropyl trimethoxy silane.

16. The encapsulated semiconductor device of claim 11 wherein said silane is N-(beta-aminoethyl) gamma-aminoisobutyl, methyl dimethoxy silane.

17. The encapsulated semiconductor device of claim 11 wherein said silane is present in said encapsulant in an amount of from about 0.3 to 3 percent by weight.

18. The encapsulated semiconductor device of claim 11 wherein said encapsulated semiconductor device exhibits a change in $\beta$ value no greater than about 30 percent of its original value when subjected to reverse bias at a temperature of about 185°C and up to about one-half of its rated breakdown voltage for a period of from about 10 to 20 hours.

19. The method of claim 1 wherein said encapsulant contains an inorganic filler in an amount of not more than about 70 percent by weight based upon the total weight of said encapsulant.

20. The encapsulated semiconductor of claim 11 wherein said encapsulant contains an inorganic filler in an amount of not more than about 70 percent by weight based upon the total weight of said encapsulant.

* * * * *